(12) United States Patent
Lecomte

(10) Patent No.: US 6,711,914 B2
(45) Date of Patent: Mar. 30, 2004

(54) PROCESS FOR PRETREATING A NATURAL GAS CONTAINING ACID COMPOUNDS

(75) Inventor: Fabrice Lecomte, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 27 days.

(21) Appl. No.: 10/141,068

(22) Filed: May 9, 2002

(65) Prior Publication Data

US 2003/0000698 A1 Jan. 2, 2003

(30) Foreign Application Priority Data

May 11, 2001 (FR) .......................................... 01/06224
Jun. 26, 2001 (FR) .......................................... 01/08387

(51) Int. Cl.$^7$ ................................................. F25J 1/00
(52) U.S. Cl. ........................ 62/625; 62/635; 62/929
(58) Field of Search ........................ 62/619, 625, 635, 62/929

(56) References Cited

U.S. PATENT DOCUMENTS

| | | | | |
|---|---|---|---|---|
| 551,023 A | * | 12/1895 | Windhausen | |
| 2,805,734 A | * | 9/1957 | Riess et al. | |
| 4,529,424 A | * | 7/1985 | Gazzi et al. | |
| 4,533,373 A | * | 8/1985 | Butz et al. | |
| 4,680,042 A | * | 7/1987 | Mehra | |
| 4,824,452 A | * | 4/1989 | Grünewald et al. | |
| 5,520,249 A | * | 5/1996 | Minkkinen et al. | |
| 5,782,958 A | * | 7/1998 | Rojey et al. | |
| 5,868,004 A | * | 2/1999 | Rojey et al. | |
| 6,105,390 A | * | 8/2000 | Bingham et al. | |

FOREIGN PATENT DOCUMENTS

DE        198-30-458 C   *  3/2000

* cited by examiner

Primary Examiner—William C. Doerrler
(74) Attorney, Agent, or Firm—Antonelli, Terry, Stout & Kraus, LLP

(57) ABSTRACT

Process for pretreating a natural gas under pressure containing hydrocarbons, acid compounds such as hydrogen sulfide and carbon dioxide, and water. The natural gas is cooled to condense part of the water. The partially dehydrated natural gas is then contacted with a liquid stream consisting of a majority of hydrogen in two successive contact zones so as to obtain a natural gas containing substantially no water any more. Finally, this dehydrated natural gas is cooled to condense and separate the acid compounds, this cooling stage being carried out by means of a heat exchanger, an expander or a venturi neck.

12 Claims, 4 Drawing Sheets

PROCESS FOR PRETREATING A NATURAL GAS CONTAINING ACID COMPOUNDS

FIELD OF THE INVENTION

The invention relates to a process for pretreating a very acid natural gas containing a substantial amount of acid compounds such as hydrogen sulfide ($H_2S$) and carbon dioxide ($CO_2$).

BACKGROUND OF THE INVENTION

The work done by the applicant had allowed to propose, in patent EP-0,665,046, a process intended to eliminate a substantial amount of the acid compounds present in the natural gas at the well outlet, a process whose simplicity enabled ready implementation with a minor investment. According to the process, the initial natural gas is contacted in a cyclone type enclosure with a liquid rich in acid compounds so as to obtain, on the one hand, at the top of the cyclone enclosure, a gaseous fraction depleted in acid compounds and on the other hand, at the bottom of the enclosure, a liquid phase containing the major part of the acid compounds and water. The liquid phase collected at the bottom of the enclosure is reinjected into a well nearing depletion. The gaseous fraction obtained at the top of the cyclone enclosure is cooled to a low temperature (down to −30° C.), then sent to a separating drum to obtain, on the one hand, a gas freed of acid compounds and, on the other, a condensate rich in acid compounds which is recycled to the cyclone enclosure.

However, the process described in patent EP-0,665,046 comprises drawbacks:
1) The presence of water in the gaseous fraction cooled to a low temperature is likely to lead, throughout the circuit, to the formation of solid hydrates that may eventually clog the pipes or damage the constituent elements of the device used. This is why the process described in patent EP-0,665,046 recommended the use of an anti-hydrate, preferably methanol, to prevent hydrate formation during cooling of the gaseous fraction from the cyclone enclosure.
2) An appreciable amount of hydrocarbons is carried along with the liquid phase collected at the bottom of the cyclone enclosure. The loss of hydrocarbons carried along with the liquid at the bottom of the cyclone enclosure can reach 10% of the amount of gas treated.

The object of the present invention is notably to overcome the aforementioned drawbacks.

It has been discovered by the applicant that it is possible, under suitable thermodynamic conditions, to concentrate the initial natural gas with methane while removing the majority of the acid gases and substantially all of the water it contains. The expression substantially all of the water means that the amount of water present in the final gas is less than 50 ppm by mole, preferably less than 10 ppm by mole, and more preferably less than 5 ppm by mole. The present invention proposes replacing the cyclone type contacting enclosure by several contacting zones, each contacting zone being operated under predetermined pressure and temperature conditions.

The present invention also proposes using various means for cooling the gaseous fraction obtained at the top of the cyclone enclosure.

SUMMARY OF THE INVENTION

The present invention proposes a process for pretreating a natural gas under pressure containing hydrocarbons, at least one of the acid compounds $H_2S$ and $CO_2$ and water, the process comprising the following stages:
a) cooling the natural gas so as to produce a liquid phase and a gas phase,
b) contacting, in a first contact zone, the gas phase obtained in stage a) with a liquid phase obtained in stage c) to produce a gas phase and a liquid phase,
c) contacting, in a second contact zone, the gas phase obtained in stage b) with a liquid phase obtained in stage d) to produce a gas phase and a liquid phase,
d) cooling the gas phase obtained in stage c) to produce a liquid phase and a gas phase.

In stage d) of the process according to the invention, the gas phase obtained in stage c) can be cooled by means of a heat exchanger and/or of an expander.

The process according to the invention can also comprise a stage of:
e) cooling the gas phase obtained in stage d) by means of an expander to produce a gas phase and a liquid phase which is recycled to stage c).

If the process according to the invention uses an expander, it can comprise a stage of:
f) compressing at least one of the gas phases obtained in stage d) and stage e) using the energy recovered from the expander.

In stage d) of the process according to the invention, the gas phase obtained in stage c) can be cooled by means of a venturi neck, said liquid phase being discharged in the vicinity of the venturi neck and said gas phase being collected at the outlet of the divergent tube of the venturi neck. The liquid phase discharged in the vicinity of the venturi neck can be cooled to produce the liquid recycled to stage c) and a gas phase.

The gas phases obtained in stages d) and e) can be used to cool the gas phase obtained in stage c) and/or to cool the natural gas in stage a).

The liquid obtained in stage b) can be heated in the first contact zone.

In stage a) of the process according to the invention, the natural gas can be at a pressure of 8 MPa and at a temperature above 15° C.

The liquids obtained in stages a) and b) can be injected into a well.

According to the present invention, after treating the natural gas from the production well, a final gas containing the major part of the hydrocarbons contained in the gas before treatment is recovered. What is referred to as the major part of the hydrocarbons is at least 90% hydrocarbons, preferably at least 95% hydrocarbons and most preferably at least 97% hydrocarbons in relation to the hydrocarbons contained in the gas before treatment.

The present invention advantageously allows to avoid using an anti-hydrate such as methanol, whose transportation, use and regeneration are generally expensive, complex and which is dangerous to handle.

BRIEF DESCRIPTION OF THE DRAWINGS

Other features and advantages of the invention will be clear from reading the description hereafter, given by way of examples within the scope of non limitative applications, with reference to the accompanying drawings wherein.

DETAILED DESCRIPTION

Figure 1:
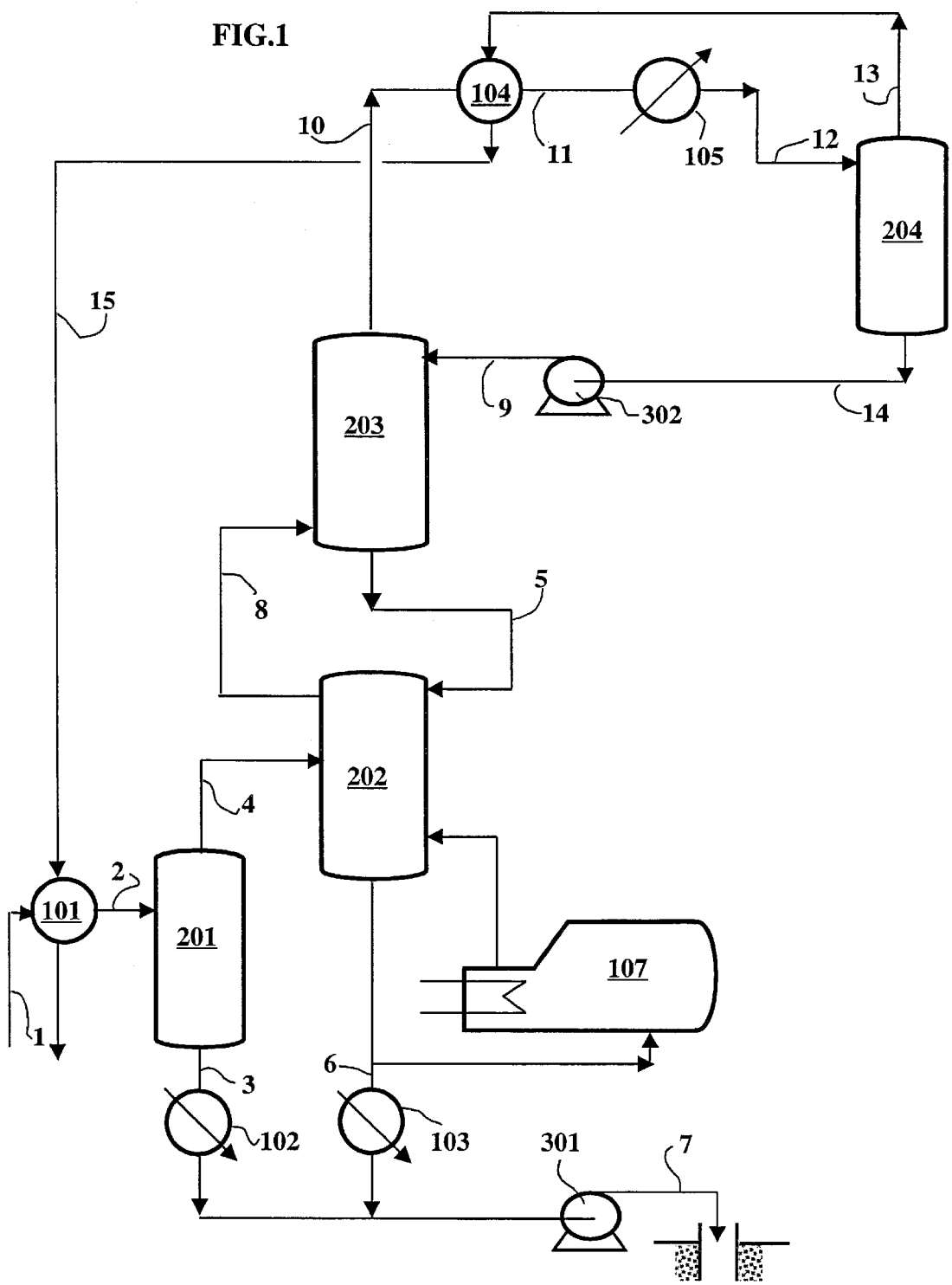
FIG. 1 is a flowsheet of the process according to the invention.

In the example of embodiment of the process according to the invention shown in FIG. 1, a very acid natural gas coming from a production well through a line (1) at a pressure of 8 MPa and a temperature of 50° C., saturated with water (3600 ppm by mole), containing 32% by mole of $H_2S$, 11% by mole of $CO_2$ and 57% by mole of methane (less than 1% by mole of $C_2^+$), is fed into a heat exchanger (101) where it is cooled to 30° C. The cooling temperature is selected so as to be slightly higher than the temperature of hydrate formation at the pressure of the natural gas flowing in through line (1). The fluid at the outlet of exchanger (101) is fed through a line (2) into a separator (201), and a liquid effluent containing essentially water and a very low proportion of dissolved acid compounds is discharged through a line (3). This liquid effluent can possibly be heated in heat exchanger (102). A water-saturated gas containing 1550 ppm by mole of water is also discharged from separator (201) through a line (4). Cooling in exchanger (101) thus allows to obtain a gas with a much lower water content.

The gas flowing out of separator (201) through line (4) is fed into a first contacting zone (202). This contacting zone (202) works at a pressure of 7.97 MPa and a temperature of about 17° C. It can consist of a drum provided with packings known to the man skilled in the art. It receives, through a line (5), a liquid stream consisting of a majority of $H_2S$ (about 70% by mole) at a temperature of about 5° C. A mixture is thus formed by contacting the gas flowing in through line (4) and the liquid flowing in through line (5) in zone (202). This contacting operation simultaneously allows to

- increase the molar fraction of $H_2S$ in the mixture contained in zone (202),
- dissolve the (mainly sulfur-based) solid particles possibly present in the mixture contained in zone (202). The work done by Alberta Sulfur Research Ltd. and presented in the publication entitled <<Recent Developments in the Mitigation of Sulfur Deposition in Sour Gas Facilities>> (P. D. Clark, P. Davis, J. Simion, E. Fitzpatrick and C. S. C. Lau—Laurance Reid Gas Conditioning Conference 1995, Norman, Okla.) shows in fact that the solubility of sulfur is substantially increased when the molar percentage of $H_2S$ in the mixture exceeds 40%, and
- obtain a partially dehydrated gas flowing out of zone (202) through line (8). In fact, the water contained in the gas flowing in through line (4) is absorbed by the liquid flowing in through line (5) because water has a higher affinity for $H_2S$ than for hydrocarbons.

A liquid consisting of more than 75% by mole of $H_2S$, the rest being water, $CO_2$ and a low proportion of methane carried along, is obtained at the bottom of zone (202). The hydrates are possibly recovered as deposits in this part of the zone. This liquid is discharged through line (6), possibly heated in exchanger (103), mixed with the liquid effluent collected at the bottom of separator (201) and discharged through line (7) by means of a pump (301) at a pressure of 38 MPa prior to being reinjected into a depleted oil well.

The temperature of zone (202) is adjusted so as to be sufficiently high to prevent hydrate formation. However, in cases where hydrates should form, contacting zone (202) can be designed as a cyclone type enclosure so as to prevent clogging by the solid particles. A heating means (107) can also be used to raise the temperature of the mixture in zone (202) above the hydrate formation temperature. This heating means can consist of a reboiler (107) heating the liquid at the bottom of zone (202). The heat supplied by reboiler (107) also allows to vaporize the hydrocarbons present in the liquid at the bottom of zone (202) and thus to limit the loss of hydrocarbons carried along with the liquid discharged through line (6) at the bottom of zone (202).

At the top of contact zone (202), a gas essentially consisting of $H_2S$ (33% by mole), $CO_2$ (12% by mole) and methane (54% by mole) and greatly depleted in water (200 ppm by mole) is discharged through line (8).

The gas coming from first contact zone (202) through line (8) is fed into a second contacting zone (203). This contacting zone (203) works at a pressure of 7.94 MPa and a temperature of about 5° C. It receives a liquid stream consisting of about 50% by mole of $H_2S$ through a line (9), which is at a temperature of about −30° C. This liquid $H_2S$ makeup, which contains practically no water any more (40 ppm by mole), allows to remove the majority of the water present in the gas contained in zone (203) as a result of the affinity of the dehydrated liquid $H_2S$ for water which is higher than the affinity of hydrocarbons for water.

A gas essentially consisting of $H_2S$, $CO_2$ and methane, and containing substantially no water any more (about 16 ppm by mole), is discharged through line (10) at the top of contact zone (203).

The gas carried by line (10) flows through various cooling systems to liquefy the acid compounds, and first a gas-gas heat exchanger (104). A fluid at about −5° C. is discharged from exchanger (104) through line (11). This fluid is fed into a heat exchanger (105) using a propane coolant, for example, and flows out through line (12) at a temperature of −30° C.

The fluid circulating in line (12) is fed into separating drum (204). Drum (204) is at a temperature of −30° C. and a pressure of 7.88 MPa. A gas partially freed of acid compounds is discharged from drum (204) through line (13) and a condensate rich in $H_2S$ and $CO_2$ is discharged through line (14). The condensate circulating in line (14) is recycled by means of pump (302) to contact zone (203) through line (9). The methane contained in the condensate circulating in line (14) is mostly recovered in contact zone (203).

The gas circulating in line (13) can be used as a cooling fluid in exchanger (104), then in exchanger (101).

Finally, a 823 kmol/h methane loss is observed, i.e. less than 7% by mole of the amount present in the feed flowing in through line (1). The feed gas has been freed of 4750 kmol/h of $H_2S$, i.e. 72% by mole of the amount present in the feed. The main advantage of the process according to the invention is to always use streams having molar fractions of water and associated temperatures which are such that hydrate formation is impossible. This is due in particular to the use of drum (201) allowing to reduce the amount of water present in the gas and to the use of the two contact zones (202) and (203) allowing to obtain a very water poor gas than can be cooled thereafter without hydrate formation risk. Thus, the process according to the invention does not require mixing the natural gas with an anti-hydrate compound.

Without departing from the scope of the invention, it is possible to use more than two contact zones. One or more contact zones working under intermediate thermodynamic conditions in relation to zones (202) and (203) can be arranged between contact zones (202) and (203).

Table 1 hereafter shows, in the embodiment example described in connection with FIG. 1, the material balance obtained with the process:

TABLE 1

| Line | 1 | 3 | 4 | 6 | 13 | 14 |
|---|---|---|---|---|---|---|
| Temperature (° C.) | 50.0 | 30.0 | 30.0 | 17.0 | −30.0 | −30.0 |
| Pressure (MPa) | 8.00 | 7.97 | 7.97 | 7.97 | 7.88 | 7.88 |
| Molar flow rate (kmol/h) | | | | | | |
| $H_2O$ | 75.3 | 42.9 | 32.3 | 32.3 | 0.0* | 0.4 |
| $N_2$ | 8.1 | 0.0* | 8.1 | 0.2 | 7.9 | 1.0 |
| $CO_2$ | 2219.4 | 0.1 | 2219.3 | 614.9 | 1604.3 | 1715.2 |
| $H_2S$ | 6570.7 | 0.9 | 6569.9 | 4749.6 | 1820.4 | 4355.9 |
| Methane | 11839.8 | 0.0* | 11839.8 | 823.8 | 11015.6 | 3235.5 |
| Ethane | 96.2 | 0.0* | 96.2 | 24.3 | 71.9 | 65.4 |
| Propane | 37.2 | 0.0* | 37.2 | 22.8 | 14.4 | 29.4 |
| Butane | 5.0 | 0.0* | 5.0 | 4.6 | 0.4 | 1.8 |
| Pentane | 2.3 | 0.0* | 2.3 | 2.3 | 0.0* | 0.2 |
| Total (kmol/h) | 20854.0 | 44.0 | 20810.1 | 6274.9 | 14534.9 | 9405.0 |

*below 0.05

Figure 2:
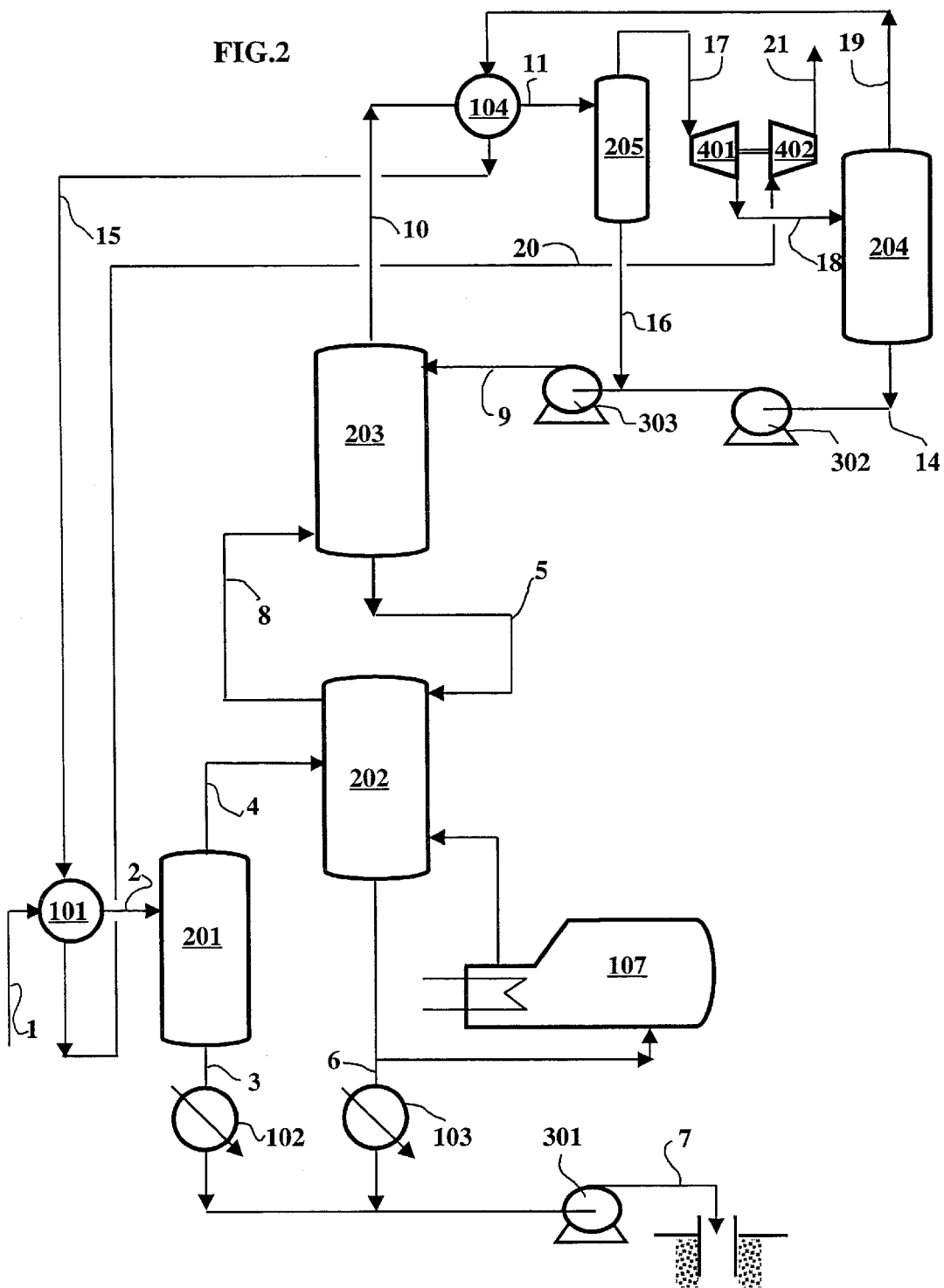
FIG. 2 shows a variant of the process according to the invention using an expander.

Another possible configuration of the device described in FIG. 1 allowing the present process to be applied is shown in FIG. 2. The change in relation to FIG. 1 is relative to the cooling means used to cool the fluid circulating in line (11).

In FIG. 2, the stream discharged from exchanger (104) through line (11) at a temperature of −5° C. is sent to a separating drum (205). This drum (205) allows to separate an effluent rich in acid compounds, discharged through line (16), and a gas discharged through line (17). Line (17) carries the gas to an expander (401) where it undergoes an isentropic expansion. The stream flowing out of expander (401) is at a low temperature (about −30° C.) and it is sent through line (18) into separating drum (204). A gas partially freed of acid compounds is discharged from drum (204) through line (19) and a condensate rich in $H_2S$ and $CO_2$ is discharged through line (14). Separation of the gas partially freed of acid compounds and of the condensate rich in $H_2S$ and $CO_2$ is favoured by the low pressure value in drum (204) obtained after expansion of the gas in expander (401). The pressure of the condensate circulating in line (14) is raised by means of pump (302) and the condensate is mixed with the liquid stream coming from drum (205) through line (16). This mixture is recycled to contact zone (203) by means of pump (303).

The gas flowing from drum (204) through line (19) can be used as a cooling fluid in exchanger (104), then in exchanger (101). This gas, at the outlet of exchanger (101), is sent through line (20) to compressor (402) in order to be recompressed prior to being exported through line (21). Compressor (402) can be connected to expander (401) so as to use the isentropic expansion work as a source of energy. A second compressor supplied with energy by a source external to the process of the invention can also compress the gas from drum (204) in order to compensate for the energy loss upon the expansion and the compression performed by expander (401) connected to compressor (402).

Table 2 hereafter shows, in the embodiment example described in connection with FIG. 2, the material balance obtained:

TABLE 2

| Line | 1 | 11 | 17 | 19 | 21 |
|---|---|---|---|---|---|
| Temperature (° C.) | 50.0 | −5.0 | −5.0 | −30.0 | 49.0 |
| Pressure (MPa) | 10.0 | 9.95 | 9.95 | 5.1 | 7.7 |
| Molar flow rate (kmol/h) | | | | | |
| $H_2O$ | 75.3 | 0.4 | 0.2 | 0.0* | 0.0* |
| $N_2$ | 8.1 | 8.9 | 8.7 | 8.7 | 8.8 |
| $CO_2$ | 2219.4 | 3320.0 | 3030.0 | 2155.8 | 2149.5 |
| $H_2S$ | 6570.7 | 6176.1 | 5301.5 | 1987.3 | 1961.1 |
| Methane | 11839.8 | 14251.1 | 13642.7 | 13379.2 | 13390.5 |
| Ethane | 96.2 | 137.0 | 125.6 | 99.3 | 99.3 |
| Propane | 37.2 | 44.0 | 38.3 | 18.7 | 18.6 |
| Butane | 5.0 | 2.2 | 1.8 | 0.4 | 0.4 |
| Pentane | 2.3 | 0.3 | 0.2 | 0.0* | 0.0* |
| Total (kmol/h) | 20854.0 | 23940.0 | 22148.9 | 17649.4 | 17628.1 |

*less than 0.05

Figure 3:
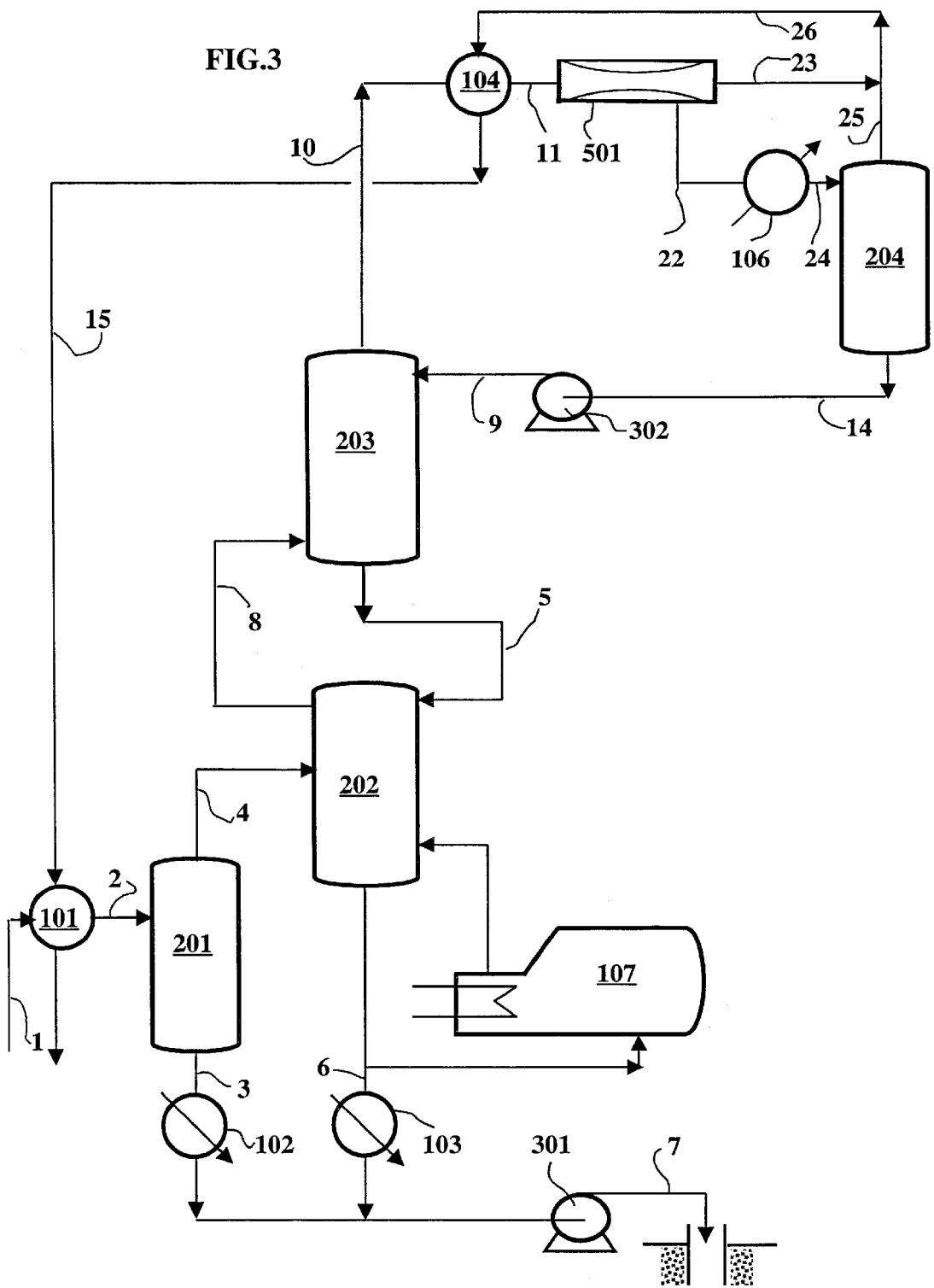
FIG. 3 shows a variant of the process according to the invention using a venturi neck type separator.

A third possible configuration of the device described in FIG. 1 allowing the present process to be applied is shown in FIG. 3. The change in relation to FIG. 1 is relative to the cooling means used to cool the fluid circulating in line (11).

In FIG. 3, the stream discharged from exchanger (104) through line (11) at a temperature of −5° C. is sent through a venturi neck type separator (501).

Figure 4:
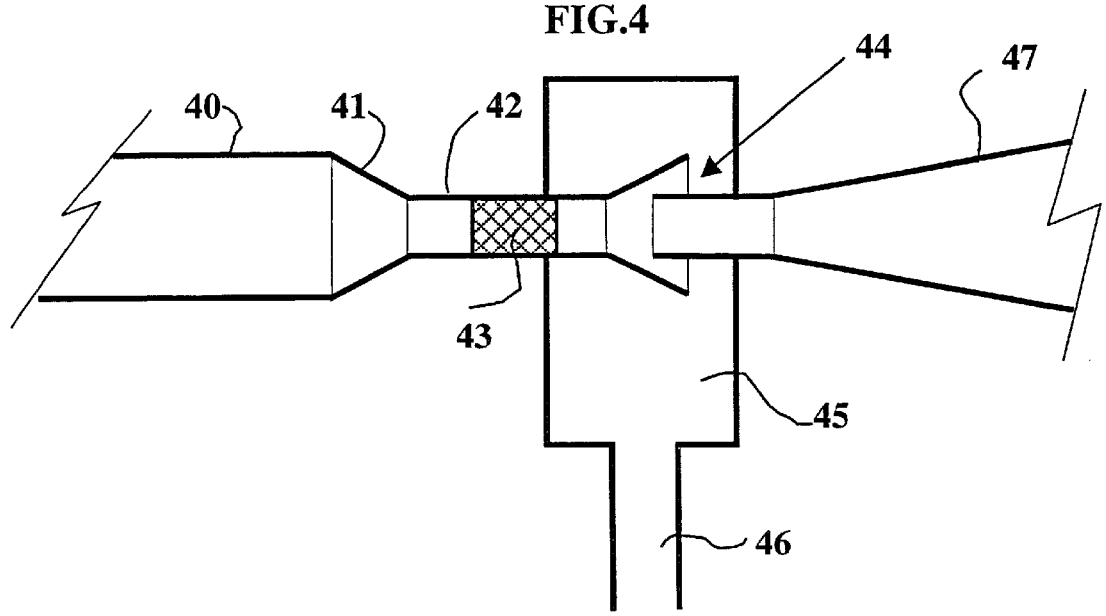
FIG. 4 shows a venturi neck type separator.

FIG. 4 shows in detail venturi neck type separator (501). It comprises an inlet line (40) for the gas to be treated. This line (40) is extended by a convergent tube (41), then by tube (42) of small diameter in relation to line (40). This tube (42) is the venturi neck. Thus, the gas fed into line (40) undergoes a velocity increase that can reach a supersonic velocity in venturi neck (42). This velocity increase allows an isentropic expansion, i.e. a pressure and temperature reduction of the gas in venturi neck (42). If the gas treated contains acid compounds, they condense as fine droplets. Delta blades (43) arranged in venturi neck (42) impart the gas a swirling motion so that the condensate droplets are pressed against the inner wall of venturi neck (42) in form of a thin liquid film. A circumferential slot (44) arranged downstream from delta blades (43) in venturi neck (42) allows to recover the thin liquid film in enclosure (45) and to discharge it through line (46). Downstream from slot (44), the gas separated from the condensed droplets undergoes a velocity decrease through divergent tube (47). This velocity decrease is accompanied by a pressure and temperature increase of the gas at the outlet of divergent tube (47). This type of separator can be, for example, a TWISTER Supersonic Separator marketed by the TWISTER BV company.

With reference to FIG. 3, the gas fed into separator (501) is expanded under isentropic conditions at the level of the venturi neck and cooled (30 bars and −46° C.). Thus, at the level of the venturi neck, an effluent rich in $H_2S$ is condensed. This effluent is collected in the vicinity of the venturi neck and discharged through line (22). At the outlet of the venturi neck, the gas is channelled in a divergent tube, which allows its pressure and temperature to rise (75 bars and 19° C.). The gas flows out of separator (501) through line (23). The venturi neck type separator is a gas cooling means which requires no energy supply.

Thanks to the fact that the stream circulating in line (10) only contains a small amount of water (about 16 ppm by mole), no hydrates are formed at the level of separator (501) or in the liquid effluent collected through line (22). Thus, the process according to the invention requires no continuous use of an anti-hydrate. The effluent circulating in line (22) is cooled to −30° C. through heat exchanger (106) which can use a propane coolant. The cooled effluent is sent to drum (204) through line (24). Drum (204) produces a liquid effluent rich in H$_2$S discharged through line (14) and a gas discharged through line (25). This gas circulating in line (25) is remixed with the gas circulating in line (23) so as to produce a gas mixture circulating in line (26). This gas mixture is used as a coolant in exchanger (104), then in exchanger (101) prior to being exported. The liquid effluent circulating in line (14) is sent back, by means of pump (302) and line (9), to contact zone (203).

Table 3 shows, in the embodiment example described in connection with FIG. 3, the material balance obtained:

TABLE 3

| Line | 1 | 11 | 23 | 25 | 26 |
|---|---|---|---|---|---|
| Temperature (° C.) | 50.0 | −5.0 | 19.0 | −30.0 | 15.4 |
| Pressure (MPa) | 10.0 | 9.95 | 7.5 | 7.5 | 7.5 |
| Molar flow rate (kmol/h) | | | | | |
| H$_2$O | 75.3 | 0.4 | 0.0* | 0.0* | 0.0* |
| N$_2$ | 8.1 | 8.9 | 7.1 | 0.7 | 7.8 |
| CO$_2$ | 2219.4 | 3320.0 | 1584.5 | 83.9 | 1668.4 |
| H$_2$S | 6570.7 | 6176.1 | 1085.6 | 96.5 | 1182.1 |
| Methane | 11839.8 | 14251.1 | 10953.5 | 619.4 | 11572.9 |
| Ethane | 96.2 | 137.0 | 79.9 | 3.4 | 83.3 |
| Propane | 37.2 | 44.0 | 12.4 | 0.8 | 13.2 |
| Butane | 5.0 | 2.2 | 0.2 | 0.0* | 0.2 |
| Pentane | 2.3 | 0.3 | 0.0* | 0.0* | 0.0* |
| Total (kmol/h) | 20854.0 | 23940.0 | 13723.2 | 804.7 | 14527.9 |

*less than 0.05

What is claimed is:

1. A process for pretreating a natural gas under pressure containing hydrocarbons, at least one of the acid compounds hydrogen sulfide and carbon dioxide, and water, comprising the following stages:
   a) cooling the natural gas so as to produce a liquid phase and a gas phase,
   b) separating the liquid phase obtained in stage a) from the gas phase obtained in stage a),
   c) contacting, in a first contact zone, the gas phase obtained in stage b) with a liquid phase obtained in stage d) to produce a gas phase and a liquid phase,
   d) contacting, in a second contact zone, the gas phase obtained in stage c) with a liquid phase obtained in stage e) to produce a gas phase and a liquid phase,
   e) cooling the gas phase obtained in stage d) to produce a liquid phase and a gas phase.

2. A process as claimed in claim 1 wherein, in stage e), the gas phase obtained in stage d) is cooled by means of a heat exchanger.

3. A process as claimed in claim 1 wherein, in stage e), the gas phase obtained in stage d) is cooled by means of an expander.

4. A process as claimed in claim 2, comprising:
   f) cooling the gas phase obtained in stage e) by means of an expander to produce a gas phase and a liquid phase which is recycled to stage d).

5. A process as claimed in claim 4, comprising:
   g) compressing at least one of the gas phases obtained in stage e) and stage f) using the energy recovered from the expander.

6. A process as claimed in claim 1 wherein, in stage e), the gas phase obtained in stage d) is cooled by means of a venturi neck, said liquid phase being discharged in the vicinity of the venturi neck and said gas phase being collected at the divergent tube outlet of the venturi neck.

7. A process as claimed in claim 6 wherein, in stage e), said liquid phase discharged in the vicinity of the venturi neck is cooled to produce the liquid recycled to stage d) and a gas phase.

8. A process as claimed in claim 5, comprising:
   h) using at least one of the gas phases obtained in stage e) and in stage f) to cool the gas phase obtained in stage d).

9. A process as claimed in claim 8, comprising:
   i) using at least one of the gas phases obtained in stage e) and in stage f) to cool the natural gas in stage a).

10. A process as claimed in claim 1 wherein, in said first contact zone, the liquid obtained in stage c) is heated.

11. A process as claimed in claim 1, in stage a), the natural gas is at a pressure of 8 MPa and at a temperature above 15° C.

12. A process as claimed in claim 9, comprising:
   j) injecting the liquids obtained in stage a) and in stage c) into a well.

* * * * *